United States Patent
Li et al.

(10) Patent No.: US 12,413,289 B2
(45) Date of Patent: Sep. 9, 2025

(54) BEAM TRAINING METHOD, NETWORK DEVICE, TERMINAL, SYSTEM, AND STORAGE MEDIUM

(71) Applicant: ZTE CORPORATION, Shenzhen (CN)

(72) Inventors: Ping Li, Shenzhen (CN); Jianli Wang, Shenzhen (CN); Zhenzhe Sun, Shenzhen (CN); Yong Yu, Shenzhen (CN); Tao Lu, Shenzhen (CN); Jingyue Huang, Shenzhen (CN); Rongrong Cai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 427 days.

(21) Appl. No.: 18/001,381

(22) PCT Filed: Jun. 3, 2021

(86) PCT No.: PCT/CN2021/098157
§ 371 (c)(1),
(2) Date: Dec. 9, 2022

(87) PCT Pub. No.: WO2021/249278
PCT Pub. Date: Dec. 16, 2021

(65) Prior Publication Data
US 2023/0216561 A1 Jul. 6, 2023

(30) Foreign Application Priority Data
Jun. 11, 2020 (CN) .......................... 202010528228.3

(51) Int. Cl.
*H04B 7/00* (2006.01)
*H04B 7/06* (2006.01)
*H04W 16/28* (2009.01)

(52) U.S. Cl.
CPC .......... *H04B 7/0696* (2023.05); *H04B 7/0617* (2013.01); *H04B 7/0632* (2013.01); *H04W 16/28* (2013.01)

(58) Field of Classification Search
CPC ............... H04B 7/0696; H04B 7/0617; H04B 7/0632; H04B 7/088; H04B 7/0695;
(Continued)

(56) References Cited

U.S. PATENT DOCUMENTS

2017/0303264 A1 10/2017 Islam et al.
2018/0269950 A1* 9/2018 John Wilson ......... H04L 5/0023
(Continued)

FOREIGN PATENT DOCUMENTS

| CN | 106911371 A | 6/2017 |
| CN | 106936487 A | 7/2017 |
| CN | 110649947 A | 1/2020 |

OTHER PUBLICATIONS

3GPP Technical Specification Group Radio Access Network. "Design of beam traning," 3GPP TSG RAN WG1 Meeting #86bis, Oct. 2016, pp. 1-6.
(Continued)

*Primary Examiner* — Md K Talukder
(74) *Attorney, Agent, or Firm* — Vivacqua Crane, PLLC

(57) ABSTRACT

A beam training method, a network device, a terminal device, a system and a storage medium are disclosed. The method may include: dividing $K_1$ query beams into $Q_1$ groups; transmitting, at a time-frequency resource position within an operating beam issuing time corresponding to each beam training period, pilot information by utilizing an operating beam in an operating beam set; and, transmitting, at a time-frequency resource position within a query beam
(Continued)

issuing time corresponding to each beam training period, pilot information by utilizing a query beam in any query beam group.

16 Claims, 7 Drawing Sheets

(58) Field of Classification Search
CPC ..... H04B 7/0626; H04B 7/086; H04W 16/28; H04W 72/046; H04L 5/0094; H04L 5/0023; H04L 5/0051
See application file for complete search history.

(56) References Cited

U.S. PATENT DOCUMENTS

| | | | |
|---|---|---|---|
| 2018/0343043 A1 | 11/2018 | Hakola et al. | |
| 2020/0154409 A1 | 5/2020 | Kang et al. | |
| 2023/0155651 A1* | 5/2023 | Raghavan | H04L 5/0048 370/252 |
| 2023/0179277 A1* | 6/2023 | Yang | H04B 7/0626 455/101 |
| 2023/0216561 A1* | 7/2023 | Li | H04L 5/0023 455/101 |
| 2023/0239020 A1* | 7/2023 | Ma | H04L 5/0048 375/262 |
| 2024/0007918 A1* | 1/2024 | Patil | H04W 36/08 |
| 2025/0088237 A1* | 3/2025 | Hu | H04W 72/04 |

OTHER PUBLICATIONS

European Patent Office. Extended European Search Report for EP Application No. 21822099.4, mailed Nov. 7, 2023, pp. 1-11.
Li, Y., et al. "Beam Management in Millimeter-Wave Communications for 5G and Beyond," IEEE Access Special Section on Millimeter-Wave Communications: New Research Trends and Challenges, vol. 8, 2020, pp. 13282-13293.
3GPP Technical Specification Group Radio Access Network. "On beam grouping reporting in NR," 3GPP TSG-RAN WG1#87-AH Meeting, Jan. 16-20, 2017, pp. 1-6.
International Searching Authority. International Search Report and Written Opinion for PCT Application No. PCT/CN2021/098157 and English translation, mailed Aug. 16, 2021, pp. 1-10.

* cited by examiner

BEAM TRAINING METHOD, NETWORK DEVICE, TERMINAL, SYSTEM, AND STORAGE MEDIUM

CROSS-REFERENCE TO RELATED APPLICATION

This application is a national stage filing under 35 U.S.C. § 371 of international application number PCT/CN2021/098157, filed Jun. 3, 2021, which claims priority to Chinese patent application No. 202010528228.3 filed on Jun. 11, 2020. The contents of these applications are incorporated herein by reference in their entirety.

TECHNICAL FIELD

The present disclosure relates to the technical field of communication, and in particular to a beam training method, a network device, a terminal device, a system and a storage medium.

BACKGROUND

To obtain rich spectrum resources, the use of high carrier frequencies has attracted extensive attention in the communication industry. Although the high carrier frequencies can bring rich spectrum resources, high frequency signals may undergo high intensity loss, remarkable atmospheric absorption, heavy rain attenuation or the like during the propagation in a free space propagation path, which has a significant impact on the coverage distance of the high frequency signals. To ensure good coverage of a target region, multiple beams need to be designed on both the base station side and the terminal device side, and an optimal beam pair for communication between the base station side and the terminal device side is obtained through beam training.

In the related communication technologies, many methods are provided for beam training, but the system overhead is very high.

SUMMARY

An embodiment of the present disclosure provides a beam training method. The method may include: acquiring an operating beam set and a query beam set, the operating beam set including at least one operating beam, the query beam set including $K_1$ query beams, the $K_1$ query beams being divided into $Q_1$ query beam groups; and, issuing pilot information by utilizing time-frequency resource positions within $Q_1$ beam training periods to train the operating beam set and the query beam set, where each of the beam training periods includes an operating beam issuing time and a query beam issuing time. The issuing pilot information by utilizing time-frequency resource positions within $Q_1$ beam training periods includes: for each beam training period, transmitting, at a time-frequency resource position within an operating beam issuing time corresponding to the beam training period, pilot information by utilizing an operating beam in the operating beam set; and, transmitting, at a time-frequency resource position within a query beam issuing time corresponding to the beam training period, pilot information by utilizing a query beam in any of the query beam groups.

An embodiment of the present disclosure further provides a beam training method. The method may include: receiving, at time-frequency resource positions within $Q_1$ beam training periods, multiple pieces of pilot information from a network device, the multiple pieces of pilot information including at least one piece of operating beam pilot information and $K_1$ pieces of query beam pilot information, the operating beam pilot information being pilot information transmitted using an operating beam by the network device within $Q_1$ operating beam issuing times of $Q_1$ beam training periods, the query beam pilot information being pilot information transmitted using any query beam group by the network device within $Q_1$ query beam issuing times of $Q_1$ beam training periods; detecting signal quality of the multiple pieces of pilot information; and, feeding signal quality of beams corresponding to the multiple pieces of pilot information back to the network device.

An embodiment of the present disclosure further provides a network device. The network device may include a memory, a processor and a program stored in the memory and executable by the processor which, when executed by the processor, causes the processor to implement the first beam training method described above.

An embodiment of the present disclosure further provides a terminal device. The terminal device may include a memory, a processor and a program stored in the memory and executable by the processor which, when executed by the processor, causes the processor to implement the second beam training method described above.

An embodiment of the present disclosure further provides a beam training system. The system may include a network device configured to execute the first beam training method described above, and a terminal device configured to execute the second beam training method described above.

An embodiment of the present disclosure further provides a storage medium for computer-readable storage, storing one or more programs executable by one or more processors which, when executed by the one or more processors, cause the one or more processors to implement methods described above.

DETAILED DESCRIPTION

It should be understood that the embodiments described herein are merely used for illustrating the present disclosure, and are not intended to limit the present disclosure.

Due to the diversification of services borne on 5G, the demand for spectrum resources has been facilitated. From 5G to future 6G, to obtain rich spectrum resources, the use of high carrier frequencies has attracted extensive attention in the communication industry. At present, potential high carrier frequencies include 28 GHz, 39 GHz, 60 GHz, 70 GHz, terahertz, etc. Although the high carrier frequencies can bring rich spectrum resources, high frequency signals may undergo high intensity loss, remarkable atmospheric absorption, heavy rain attenuation or the like during the propagation in a free space propagation path, which has a significant impact on the coverage distance and scenarios of the high frequency signals in actual use.

Massive antenna arrays well make up for this defect in high frequency communication systems by a high beam-forming gain. In a high frequency communication system, a high antenna gain can be obtained by the massive antenna array and beamforming, thereby ensuring sufficient link coverage. The massive Multiple-Input Multiple-Output (MIMO) beamforming has the advantage of providing a large antenna gain in one direction, but the gain beam is often very narrow. Therefore, the use of multiple beams becomes a typical feature of high frequency communication.

Figure 1:
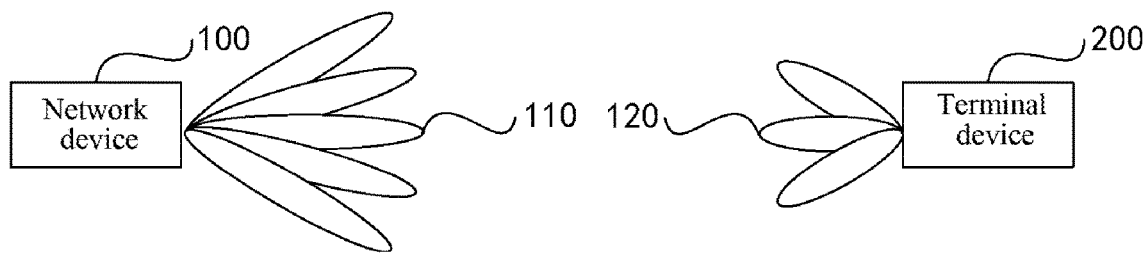
FIG. 1 is a beam structure diagram of a network device and a terminal device according to an embodiment of the present disclosure.

To ensure good coverage of a target region, multiple beams need to be designed for the network device and the terminal device. As shown in FIG. 1, multiple beams 110 are designed for the network device 100, and multiple beams 120 are designed for the terminal device 200. An optimal beam pair for communication between the network device 100 and the terminal device 200 is obtained through beam training. As a result, a large number of beams will be trained, causing a high system overhead. For example, in some cases, during beam training, pilot information needs to be issued by utilizing all beams to be trained within the beam training period, resulting in a long beam training period and high system overhead. Therefore, how to reduce the system overhead in the beam training stage is a problem to be solved.

Based on the above, the present disclosure provides a beam training method, a network device, a terminal device, a system and a storage medium, which can reduce the resources used in beam training, improve the beam training efficiency and reduce the system overhead.

Figure 2:
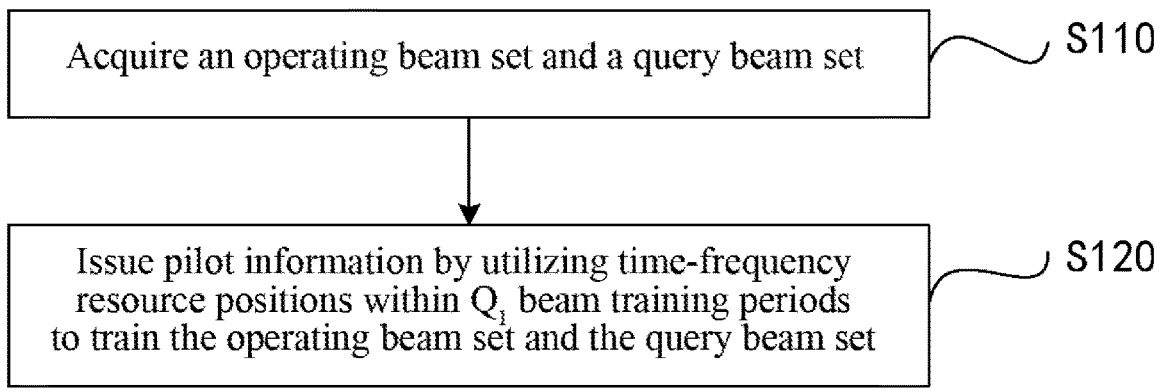
FIG. 2 is a flowchart of a beam training method according to an embodiment of the present disclosure.

In a first aspect, as shown in FIG. 2, an embodiment of the present disclosure provides a beam training method, which is applied to a network device. The method includes the following steps S110 to S120.

At S110, an operating beam set and a query beam set are acquired, where the operating beam set includes at least one operating beam, the query beam set includes $K_1$ query beams, and the $K_1$ query beams are divided into $Q_1$ query beam groups.

In some embodiments, N beams covering a target region are acquired as a beam set Z, i.e., $\{Z_1, Z_2, \ldots, Z_N\}$. A beam set to be issued is selected from the beam set Z for beam training. The issued beam set includes an operating beam set and a query beam set. The operating beam set is W, i.e., $\{W_1, W_2, \ldots, W_M\}$ and has a total of M operating beams, where M is a positive integer greater than or equal to 2; and, the query beam set is S, i.e., $\{S_1, S_2, \ldots, S_{K_1}\}$, and has a total of $K_1$ query beams, where $K_1$ is a positive integer greater than or equal to 2, with $W \in Z$, $S \in Z$, $W \cup S \in Z$, and $M+K_1 \leq N$. In some instances, the operating beams cover the beams in the target region, and the query beams may be determined by changing a beam width and/or coverage distance of the operating beams.

In some embodiments, the $K_1$ query beams are divided into $Q_1$ query beam groups, and each group has $R_1$ query beams, where $R_1*Q_1=K_1$, and $Q_1$ is a positive integer greater than or equal to 2.

The operating beams in the operating beam set are used for long-time communication of a control channel and a service channel between the network device and the terminal device. The query beams in the query beam set are used for beam discovery in the beam training process, and may be used for short-time communication of the control channel and the service channel between the network device and the terminal device.

In some embodiments, the network device is a base station, or may be other network devices which can realize the function of the base station.

At S120, pilot information is issued by utilizing time-frequency resource positions within $Q_1$ beam training periods to train the operating beam set and the query beam set.

Figure 3:
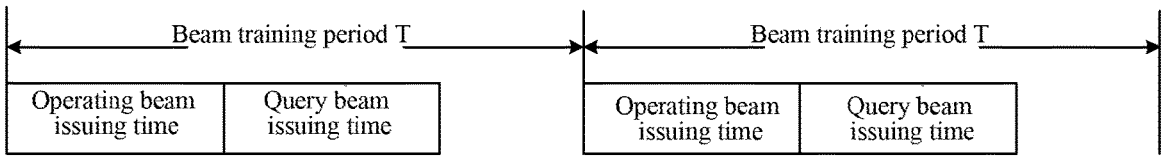
FIG. 3 is a structural diagram of a beam training period according to an embodiment of the present disclosure.

In some embodiments, as shown in FIG. 3, beam training periods T are set, and each beam training period T includes an operating beam issuing time and a query beam issuing time. The pilot information is transmitted during the operating beam issuing time by utilizing an operating beam, while the pilot information is transmitted at the query beam issuing time by utilizing a query beam. The pilot information is known information defined through a protocol by the network device and the terminal device.

Since the time-frequency resource positions (the time-frequency resource positions are time positions where the pilot information is placed in a frame structure) of the operating beams are in one-to-one mapping with the operating beams (that is, one time-frequency resource position maps one operating beam and one operating beam number), there are a total of M issued time-frequency resource positions during the operating beam issuing time within each beam training period; whereas the time-frequency resource positions of the query beams are in one-to-multiple mapping with the query beams, that is, one time-frequency resource position maps multiple query beams and query beam numbers. Since the $K_1$ query beams are grouped into $Q_1$ query beam groups and each group has $R_1$ query beams (where $R_1*Q_1=K_1$), there are a total of $R_1$ issued time-frequency resource positions at the query beam issuing time within each beam training period. That is, there are $M+R_1$ issued time-frequency resource positions within each beam training period, and the beam training of the operating beam set and the query beam set is completed by utilizing $Q_1$ beam training periods.

Figure 4:
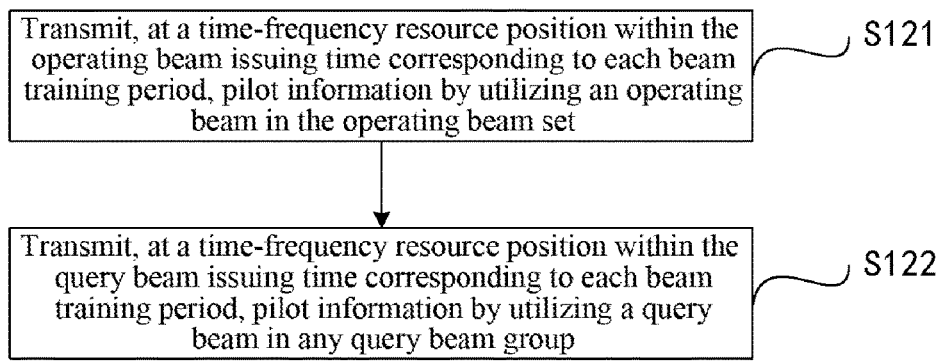
FIG. 4 is a flowchart of a step S120 of the beam training method of FIG. 2 in some embodiments.

In some embodiments, as shown in FIG. 4, S120 includes following steps of S121 to S122.

At S121, for each beam training period, pilot information is transmitted at a time-frequency resource position within the operating beam issuing time corresponding to beam training period by utilizing an operating beam in the operating beam set.

In some embodiments, as described above, the beam training of the operating beam set and the query beam set is completed by utilizing $Q_1$ beam training periods. At the time-frequency resource positions within $Q_1$ operating beam issuing times of $Q_1$ beam training periods, the network device transmits pilot information to the terminal device by utilizing M operating beams in the beam set at M corresponding time-frequency resource positions.

At S122, pilot information is transmitted at a time-frequency resource position within the query beam issuing time corresponding to each beam training period by utilizing a query beam in any query beam group.

In some embodiments, at the time-frequency resource positions within $Q_1$ query beam issuing times of $Q_1$ beam training periods, the network device transmits pilot information to the terminal device by utilizing $R_1$ query beams in any query beam group.

In some embodiments, at the time-frequency resource positions within $Q_1$ query beam issuing times of $Q_1$ beam training periods, the network device may also transmit pilot information to the terminal device by utilizing the query beams in $Q_1$ query beam groups, respectively, so as to train the $Q_1$ query beam groups within $Q_1$ corresponding beam training periods, thereby training the query beams in the query beam set. That is, in a first beam training period, the pilot information is transmitted to the terminal device at $R_1$ corresponding time-frequency resource positions by utilizing $R_1$ query beams in a first query beam group; in a second beam training period, the pilot information is transmitted to the terminal device at $R_1$ corresponding time-frequency resource positions by utilizing $R_1$ query beams in a second query beam group; and by that analogy, in a $Q_1$th beam training period, the pilot information is transmitted to the terminal device at $R_1$ corresponding time-frequency resource positions by utilizing $R_1$ query beams in the $Q_1$th query beam group. It is to be noted that the query beams in the $Q_1$ query beam groups may or may not be trained in the above order as long as it can be ensured that the $Q_1$ query beam groups are trained within $Q_1$ corresponding beam training periods so as to train the query beams in the query beam set.

So far, M operating beams in the operating beam set and $K_1$ query beams in the query beam set all have been trained.

In some cases, during training of M operating beams and $K_1$ query beams, $M+K_1$ time-frequency resource positions need to be issued within the beam training periods. In this embodiment, the operating beams and the query beams are issued by the base station. In different beam training periods, the query beams are issued in $Q_1$ groups, so that the number of time-frequency resource positions issued within each training period (the number M of operating beams+the number $R_1$ of query beams in each group) is decreased. Accordingly, more beams are trained by utilizing fewer time-frequency resource positions, resulting in an improved beam training efficiency and reduced system overhead. In addition, since the operating beams are issued within each beam training period, the operating beams have been repeatedly issued for $Q_1$ times after $Q_1$ beam training periods. Due to the increase in the number of operating beams, the opportunity of receiving operating beams by the terminal device is increased, and the coverage area of the base station is expanded.

Figure 5:
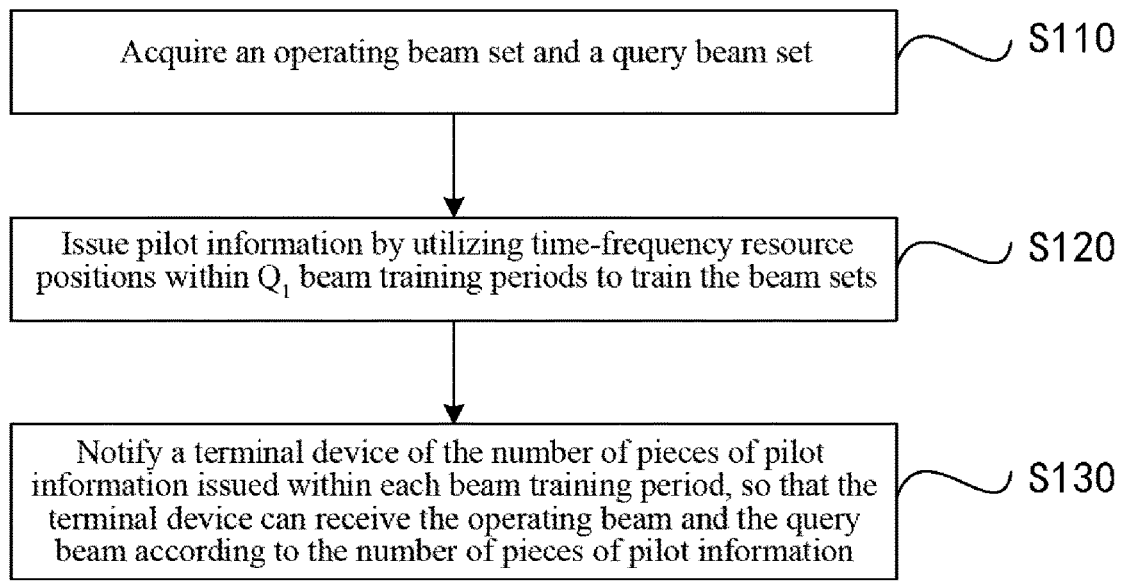
FIG. 5 is a flowchart of a beam training method according to another embodiment of the present disclosure.

In some embodiments, as shown in FIG. 5, the beam training method further includes a following step S130.

At S130, the terminal device is notified of the number of pieces of pilot information issued within each beam training period, such that the terminal device can receive the operating beams and the query beams according to the number of pieces of pilot information.

In some embodiments, as described above, $M+R_1$ time-frequency resource positions are issued within each bean training period, and the time-frequency resource positions are time positions where the pieces of pilot information are placed in a frame structure. Correspondingly, the number of pieces of pilot information issued within each beam training period is $M+R_1$, and the number of pieces of pilot information issued within $Q_1$ beam training periods is also $M+K_1$. The network device needs to notify the terminal device of the number $M+R_1$ of pieces of pilot information issued within each beam training period and the number $M+K_1$ of pieces of pilot information issued within $Q_1$ beam training periods. The terminal device receives M pieces of operating beam pilot information and $R_1$ pieces of query beam pilot information at $M+R_1$ occasions and corresponding time-frequency resource positions within each beam training period.

Figure 6:
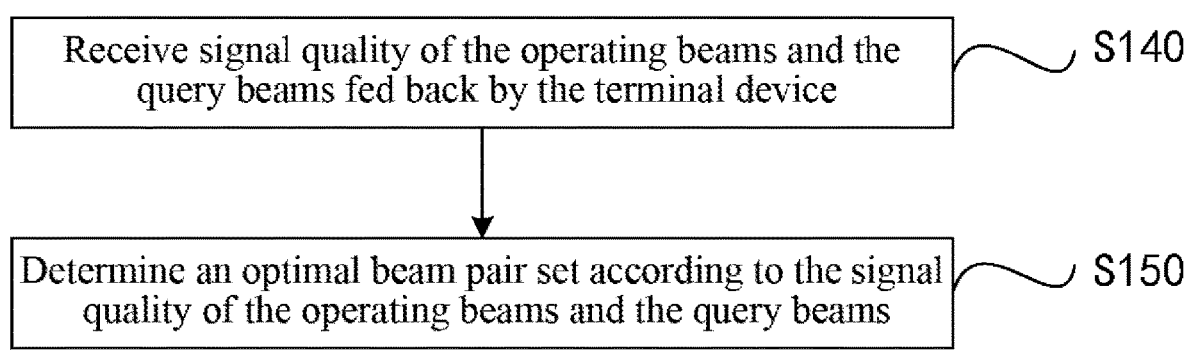
FIG. 6 is a flowchart of a beam training method according to another embodiment of the present disclosure.

In some embodiments, as shown in FIG. 6, the beam training method further includes the following steps S140 to S150.

At S140, signal quality of the operating beams and the query beams fed back by the terminal device is received.

At S150, an optimal beam pair set is determined according to the signal quality of the operating beams and the query beams.

In some embodiments, upon receiving M pieces of operating beam pilot information and $R_1$ pieces of query beam pilot information, the terminal device detects the signal quality of the pilot information and then feed the signal quality and beam numbers of $M+R_1$ beams back to the network device. The network device receives the signal quality of the operating beams and the query beams (i.e., the signal quality of the pilot information of the operating beam and the signal quality of the pilot information of the query beam) fed back by the terminal device, and then determines an optimal beam pair set according to the signal quality of the operating beams and the query beams to train beam pairs.

The beam pair is a pair of communication links formed by a network device beam and a terminal device beam. The optimal beam pair set may include one or more optimal beam pairs. The optimal beam pair may be a pair of optimal operating beams for communication between the network device and the terminal device, or may be a pair of optimal query beams for communication between the network device and the terminal device. It should be understood that, if there is only one terminal device on the terminal device side, there is only one optimal beam pair; and, if there are multiple terminal devices on the terminal device side, there are multiple optimal beam pairs in the optimal beam pair set, that is, there is an optimal beam pair between the network device and each terminal device.

In some embodiments, parameters of the single quality fed back by the terminal device include, but not limited to, Reference Signal Receiving Power (RSRP) and Signal to Interference plus Noise Ratio (SINR).

Figure 7:
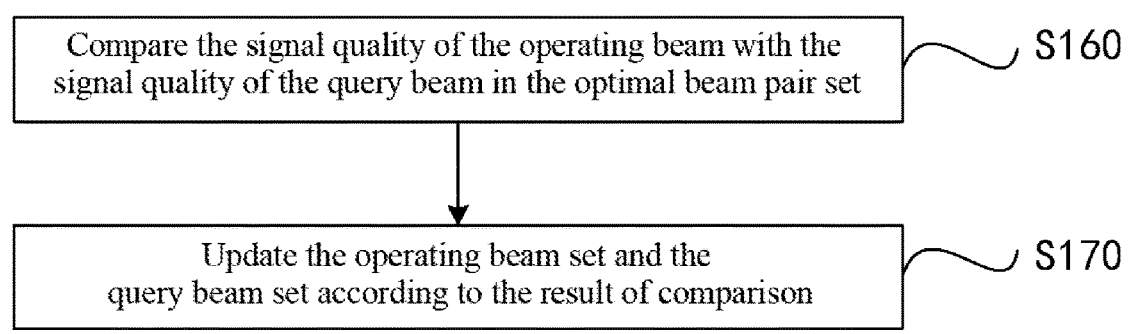
FIG. 7 is a flowchart of a beam training method according to another embodiment of the present disclosure.

In some embodiments, as shown in FIG. 7, after the optimal beam pair set is determined, the beam training method further includes the following steps S160 to S170.

At S160, the signal quality of an operating beam is compared with the signal quality of a query beam in the optimal beam pair set.

At S170, the operating beam set and the query beam set are updated according to a result of comparison.

In some embodiments, to ensure the quality of communication between the network device and the terminal device, the operating beam set and the query beam set need to be updated. By comparing the signal quality of the operating beam with the signal quality of the query beam in the optimal beam pair set fed back by the terminal device, the network device updates the operating beams in the operating beam set and the query beams in the query beam set.

Figure 8:
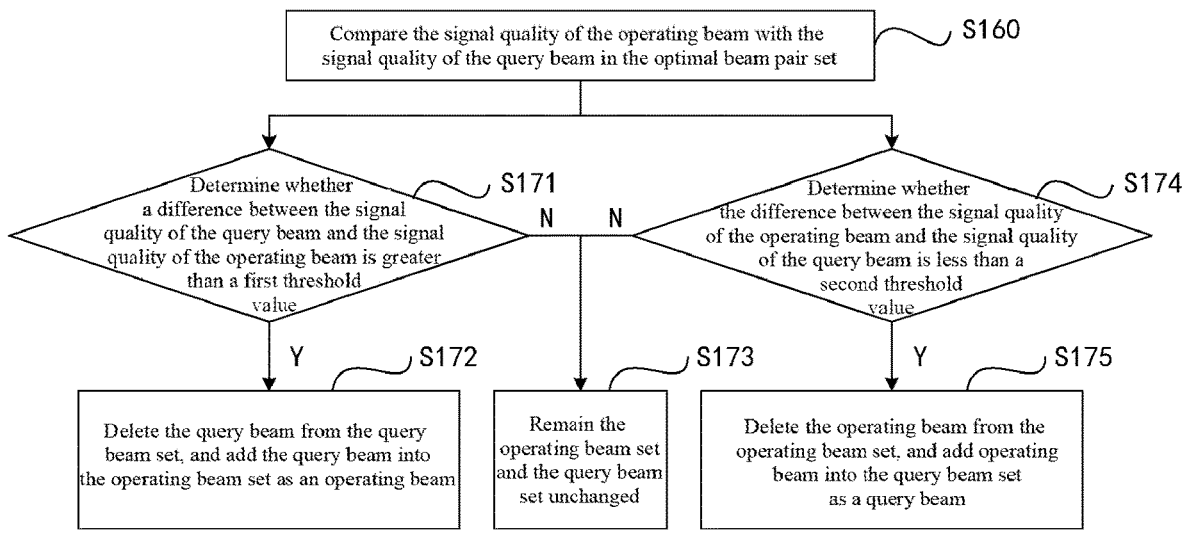
FIG. 8 is a flowchart of a step S170 of the beam training method of FIG. 7 in some embodiments.

In some embodiments, as shown in FIG. 8, S170 includes the following steps S171 to S173.

At S171, a determination is made as to whether a difference between the signal quality of the operating beam and the signal quality of the query beam in the optimal beam pair set is greater than a first threshold value; if yes, S172 will be executed; otherwise, S173 will be executed.

At S172, the query beam is deleted from the query beam set, and added into the operating beam set as an operating beam.

At S173, the operating beam set and the query beam set are remained unchanged.

In some embodiments, in the optimal beam pair set, the signal quality of the operating beam is subtracted from the signal quality of the query beam. If the difference is greater than the first threshold value, it indicates that the query beam has better communication quality (in this case, the optimal beam is the query beam), and the query beam is deleted from the query beam set and added into the operating beam set as an operating beam; otherwise, the operating beam set and the query beam set are remained unchanged.

In some embodiments, as shown in FIG. 8, S170 further includes the following steps S174 to S175.

At S174, a determination is made as to whether the difference between the signal quality of the operating beam and the signal quality of the query beam in the optimal beam pair set is less than a second threshold value; if yes, S175 will be executed; otherwise, S173 will be executed.

At S175, the operating beam is deleted from the operating beam set, and added into the query beam set as a query beam.

In some embodiments, in the optimal beam pair set, the signal quality of the query beam is subtracted from the signal quality of the operating beam. If the difference is less than the second threshold value, it indicates that the operating beam has poorer communication quality, and the operating beam is deleted from the operating beam set and added into the query beam set as a query beam.

In some embodiments, since the operating beam is used for long-time communication between the network device and terminal device, a determination mechanism needs to be added for the deletion of the operating beam to avoid erroneous determination. In some embodiments, in the optimal beam pair set, the signal quality of the query beam is subtracted from the signal quality of the operating beam. If the difference is less than the second threshold value and lasts for a preset time, it indicates that the operating beam has poorer communication quality within this preset time, and the operating beam is deleted from the operating beam set and added into the query beam set as a query beam.

In the above embodiments, the network device updates the beam sets according to the feedback from one terminal device. If there are multiple terminal devices on the terminal device side, in some embodiments, the network device may update the beam sets under a certain criterion according to the feedback from multiple terminal devices.

Figure 9:
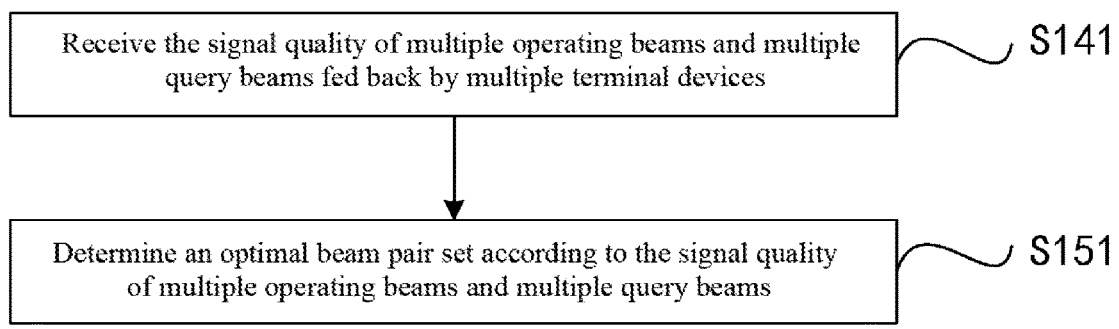
FIG. 9 is a flowchart of a step S140 and a step S150 of the beam training method of FIG. 6 in some embodiments.

Correspondingly, as shown in FIG. 9, S140 includes a following step S141.

At S141, the signal quality of multiple operating beams and multiple query beams fed back by multiple terminal devices is received.

The S150 includes a following step S151.

At S151, an optimal beam pair set is determined according to the signal quality of the multiple operating beams and the multiple query beams.

Figure 10:
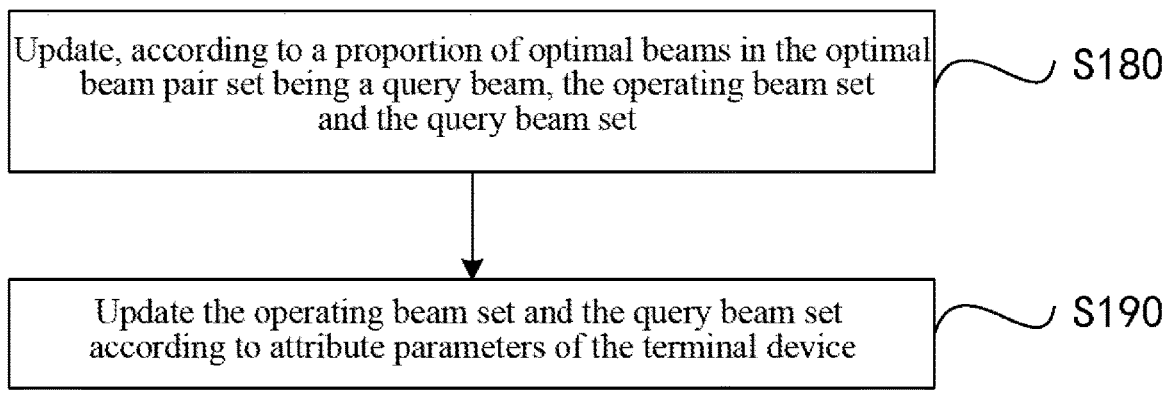
FIG. 10 is a flowchart of a beam training method according to another embodiment of the present disclosure.

As shown in FIG. 10, the beam training method further includes a following step S180 or S190.

At S180, the operating beam set and the query beam set are updated according to a proportion of optimal beams in the optimal beam pair set being a query beam fed back by the terminal device.

Alternatively, At S190, the operating beam set and the query beam set are updated according to attribute parameters of the terminal device.

In some embodiments, if there are multiple terminal devices on the terminal device side, the determined optimal beam pair set includes multiple optimal beam pairs, that is, there is an optimal beam pair between the network device and each of the terminal devices. The network device determines an optimal beam pair set according to the signal quality of multiple operating beams and multiple query beams fed back multiple terminal devices, and calculates the proportion of the optimal beams in the optimal beam pair set being a query beam. If the proportion is greater than a preset proportion, the steps S160 and S170 will be executed to update the operating beam set and the query beam set.

In some embodiments, the operating beam set and the query beam set may also be updated according to the attribute parameters of the terminal device. The attribute parameters of the terminal device may be soft attribute parameters of the terminal device, for example, the class of service of the terminal device. Taking the class of service of the terminal device including a high-priority terminal device and a common-class terminal device as an example, if the terminal device is a high-priority terminal device, regardless of the signal quality of the operating beams and the query beams or the proportion fed back by different terminal devices in the network, the network device updates the operating beams for the high-priority terminal device to ensure the normal communication between the network device and the high-priority terminal device. If the terminal device is a common-class terminal device, the network device may determine, according to the influence of the feedback from multiple terminal devices on the overall performance of the system, whether or not to update the operating beams.

In some embodiments, after the network device updates the operating beam set and the query beam set, the network device also updates the time-frequency resource positions according to the updated operating beam set and the updated query beam set.

It can be known from the above embodiment that, $M+K_1$ beams are meant to be trained by utilizing $M+K_1$ time-frequency resource positions; however, with the beam training method provided by the embodiments of the present disclosure, $M+K_1$ beams can be trained by utilizing only $M+R_1$ time-frequency resource positions, so that the beam training efficiency is improved and the system overhead is reduced.

Figure 11:
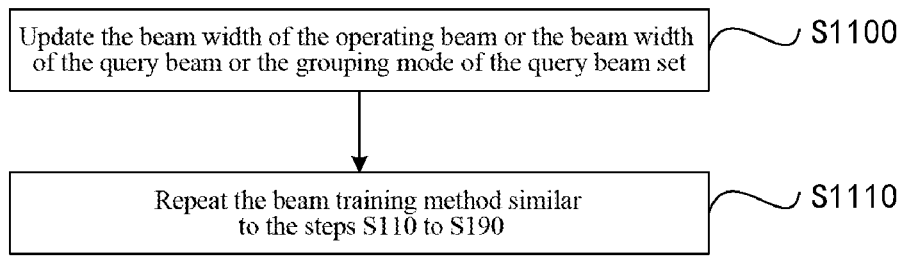
FIG. 11 is a flowchart of a beam training method according to another embodiment of the present disclosure.

In some embodiments, as shown in FIG. 11, the beam training method further includes the following steps S1100 to S1110.

At S1100, the beam width of the operating beam or the beam width of the query beam or the grouping mode of the query beam set is updated.

At S1110, the beam training method similar to the steps S110 to S190 is repeated.

Figure 12:
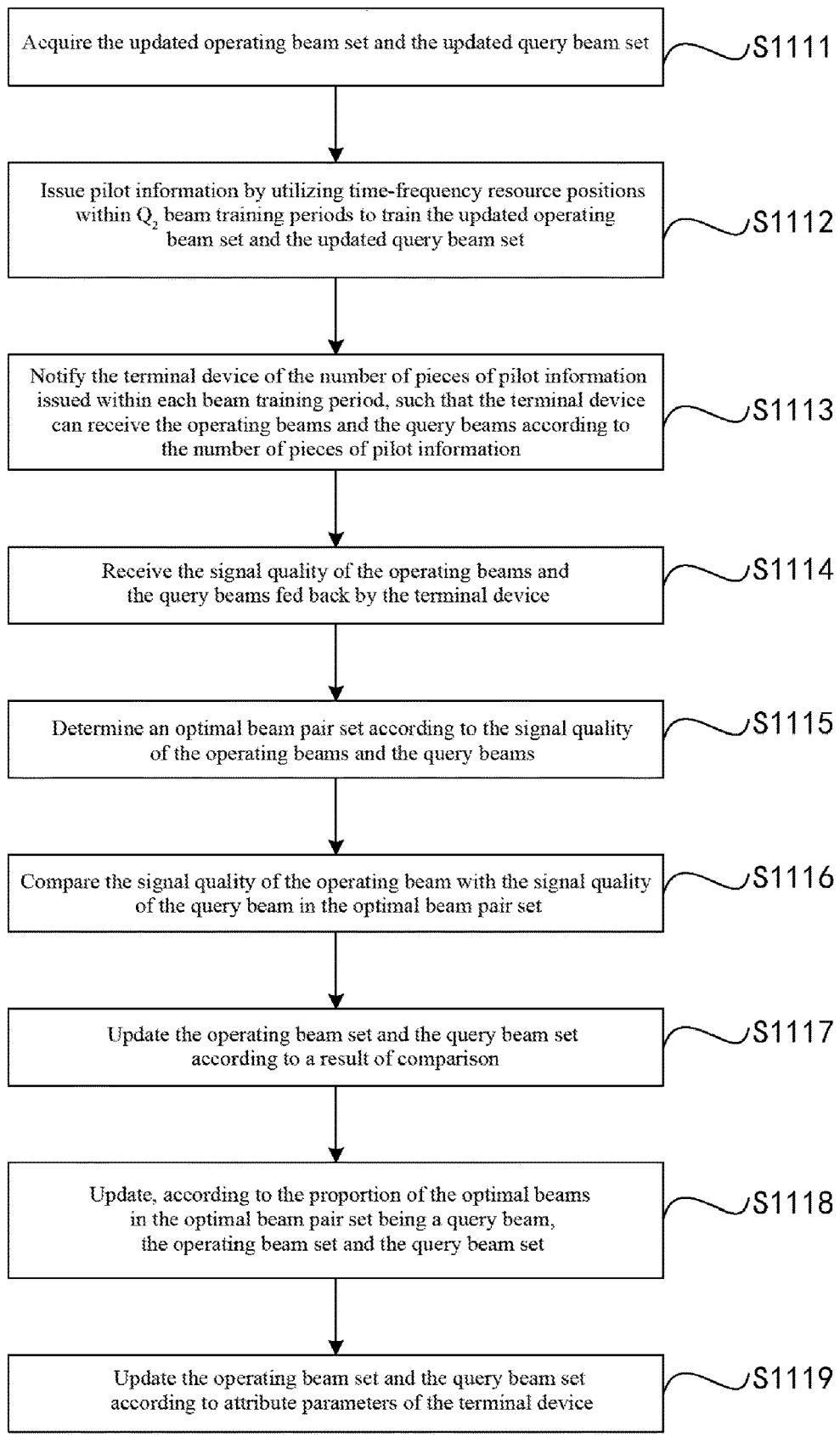
FIG. 12 is a flowchart of a step S1110 of the beam training method of FIG. 10 in some embodiments.

In some embodiments, as shown in FIG. 12, S1100 includes the following steps S1111 to S1119.

At S1111, the updated operating beam set and the updated query beam set are acquired, where the updated operating beam set includes at least one operating beam, the updated query beam set includes $K_2$ query beams, the $K_2$ query beams are divided into $Q_2$ query beam groups, and both $K_2$ and $Q_2$ are positive integers greater than or equal to 2.

In some embodiments, the $K_2$ query beams are divided into $Q_2$ query beam groups, and each group has $R_2$ query beams, where $R_2*Q_2=K_2$, and both $K_2$ and $Q_2$ are positive integers greater than or equal to 2.

At S1112, pilot information is issued by utilizing time-frequency resource positions within $Q_2$ beam training periods to train the updated operating beam set and the updated query beam set.

At S1113, the terminal device is notified of the number of pieces of pilot information issued within each beam training period, such that the terminal device can receive the operating beams and the query beams according to the number of pieces of pilot information.

At S1114, the signal quality of the operating beams and the query beams fed back by the terminal device is received.

At S1115, an optimal beam pair set is determined according to the signal quality of the operating beams and the query beams.

At S1116, the signal quality of the operating beams is compared with the signal quality of the query beams in the optimal beam pair set.

At S1117, the operating beam set and the query beam set are updated according to the result of comparison.

At S1118, the operating beam set and the query beam set are updated according to the proportion of the optimal beams in the optimal beam pair set being a query beam.

At S1119, the operating beam set and the query beam set are updated according to attribute parameters of the terminal device.

The process from S1111 to S1119 may refer to the description of the steps S110 to S190 and will not be repeated here.

Figure 13:
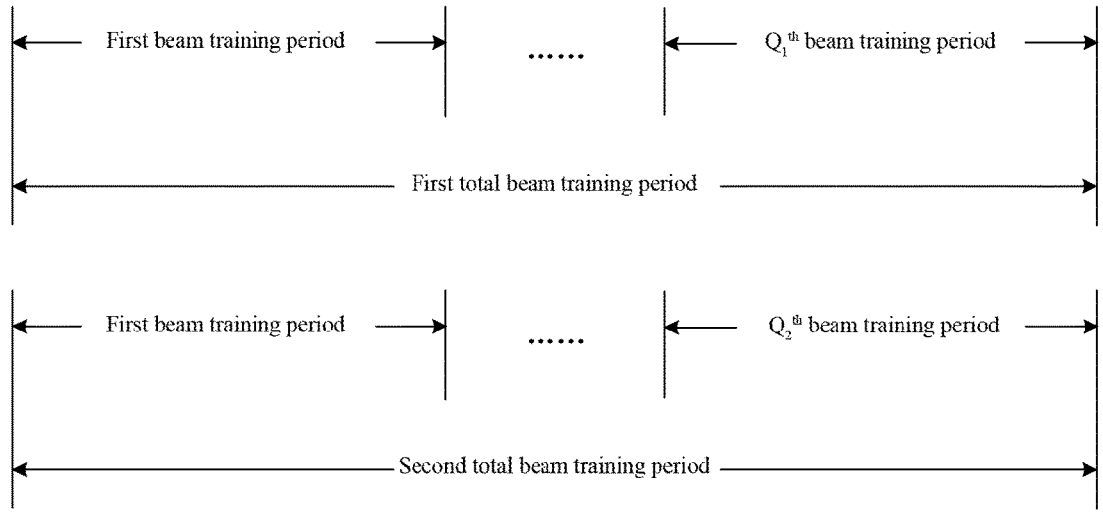
FIG. 13 is a structural diagram of a total beam training period according to an embodiment of the present disclosure.

For example, as shown in FIG. 13, the steps S110 to S190 of the beam training method are executed in a first total beam training period (the first total beam training period includes $Q_1$ beam training periods) for beam training. The beam width of the operating beam or the beam width of the query beam or the grouping mode of the query beam set is updated, and S1110 is executed in a second total beam training period (the second total beam training period includes $Q_2$ beam training periods) for beam training.

In some embodiments, in different beam training periods, by updating the beam width of the operating beam or the beam width of the query beam or the grouping mode of the query beam set to repeat the above beam training method, more types of beams can be trained, so that the communication between the base station and more types of terminal devices can be realized.

It is to be noted that the beam width is used to represent the size of the region covered by the beam. The beam width is inversely related to the number of beams. For example, if the beam width of query beams in the second beam training period is reduced by 2 times in comparison to the beam width of query beams in the first beam training period, the number of query beams to be issued in the second beam training period is twice the number of query beams to be issued in the first beam training period. Thus, two types of query beams are trained by updating the beam width of query beams.

It is also to be noted that updating the grouping mode of the query beam set may be updating the number of query beams and the number of query beams in each query beam group. For example, 24 query beams are divided into 8 groups, and each group has 3 query beams. After updating, 48 query beams are divided into 8 groups, and each group has 6 query beams.

More exemplary descriptions may refer to the following application examples two to four.

In a second aspect, an embodiment of the present disclosure provides a beam training method, which is applied to a terminal device. It is to be noted that the terminal device may be a mobile terminal device or a non-mobile terminal device. The mobile terminal device may be a mobile phone, a tablet computer, a notebook computer, a palmtop computer, a vehicle-mounted terminal device, a wearable device, a super mobile personal computer, a netbook, a personal digital assistant, etc. The non-mobile terminal device may be a personal computer, a TV set, a teller machine, a self-service machine, etc. This will not be specifically limited in the embodiments of the present disclosure.

Figure 14:
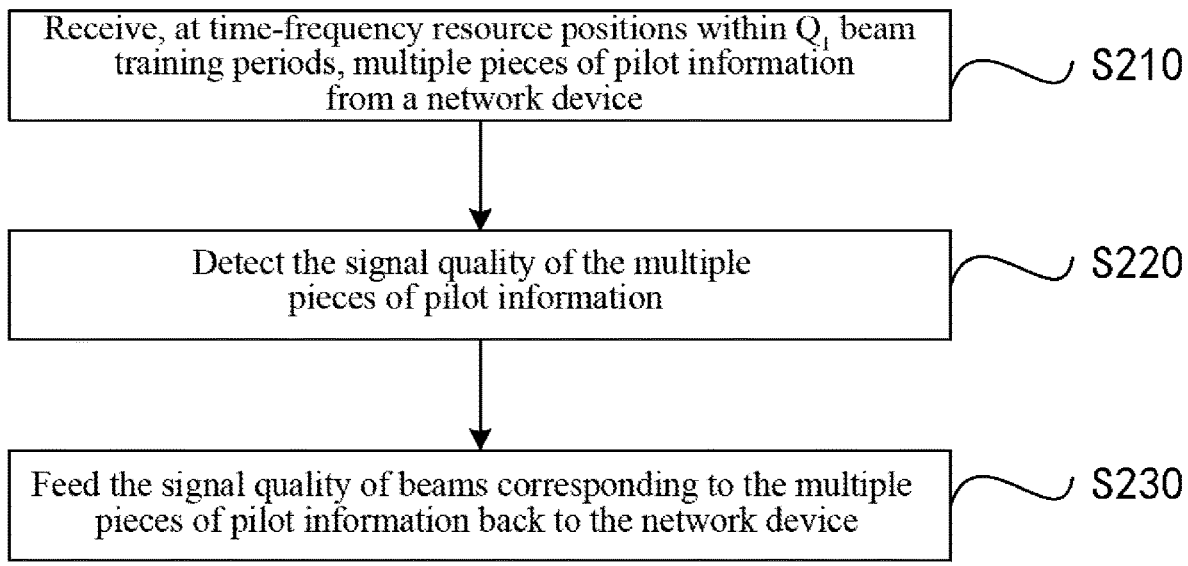
FIG. 14 is a flowchart of a beam training method according to an embodiment of the present disclosure.

As shown in FIG. 14, the method includes the following steps S210 to S230.

At S210, multiple pieces of pilot information from a network device are received at time-frequency resource positions within $Q_1$ beam training periods, where the multiple pieces of pilot information include at least one piece of operating beam pilot information and $K_1$ pieces of query beam pilot information, the operating beam pilot information is pilot information transmitted using an operating beam by the network device within $Q_1$ operating beam issuing times of $Q_1$ beam training periods, and the query beam pilot information is pilot information transmitted using any query beam group by the network device within $Q_1$ query beam issuing times of $Q_1$ beam training periods.

In some embodiments, the network device transmits operating beam pilot information to the terminal device within $Q_1$ operating beam issuing times of $Q_1$ beam training periods by utilizing an operating beam, and transmits query beam pilot information to the terminal device within $Q_1$ operating beam issuing times of $Q_1$ beam training periods by utilizing any query beam group. The terminal device receives the operating beam pilot information and the query beam pilot information at the time-frequency resource positions within $Q_1$ beam training periods. If the operating beam set acquired by the network device has M operating beams and the query beam set has $K_1$ operating beams, the number of pieces of pilot information received by the terminal device is $M+K_1$.

At S220, the signal quality of multiple pieces of pilot information is detected.

In some embodiments, upon receiving the operating beam pilot information and the query beam pilot information, the terminal device detects the signal quality of the operating beam pilot information and the query beam pilot information. Parameters to be detected include, but not limited to, Reference Signal Receiving Power (RSRP) and Signal to Interference plus Noise Ratio (SINR).

At S230, the signal quality of beams corresponding to the multiple pieces of pilot information is fed back to the network device.

In some embodiments, after the terminal device detects the signal quality of the operating beam pilot information and the query beam pilot information, the terminal device feeds the signal quality of beams corresponding to the pilot information back to the network device, such that the network device determines an optimal beam pair set according to the feedback from the terminal device and then updates the operating beam set and the query beam set according to the signal quality of the operating beams and the signal quality of the query beams in the optimal beam pair set. In some embodiments, the updating process may refer to the description in the first aspect.

Figure 15:
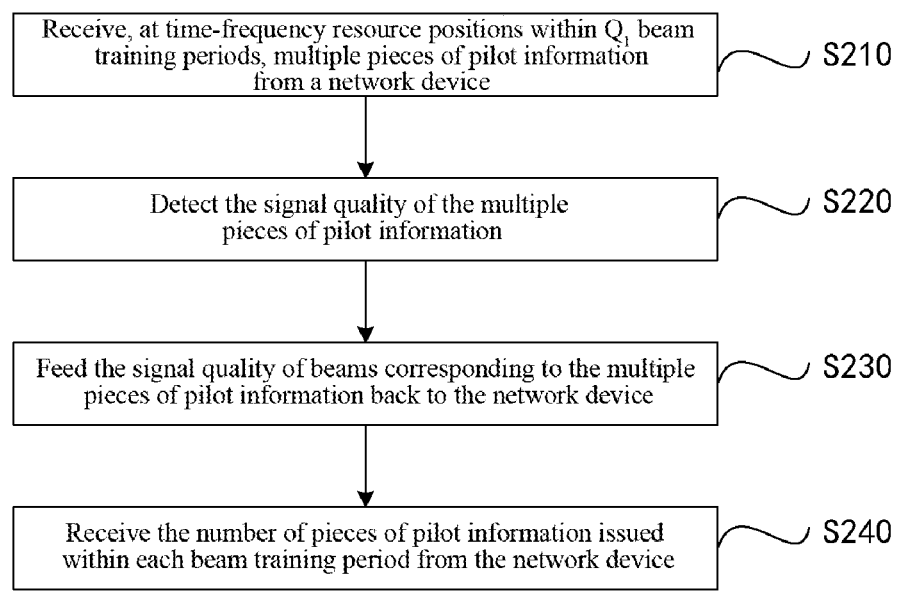
FIG. 15 is a flowchart of a beam training method according to another embodiment of the present disclosure.

In some embodiments, as shown in FIG. 15, the beam training method further includes a following step S240.

At S240, the number of pieces of pilot information issued within each beam training period from the network device is received.

Correspondingly, S210 includes:

receiving pilot information corresponding to the number of pieces of pilot information at time-frequency resource positions within each beam training period.

In some embodiments, the terminal device receives the number of pieces of pilot information issued within each beam training period from the network device. If the operating beam set acquired by the network device has M operating beams and the query beam set has $R_1$ query beams, the number of pieces of pilot information received by the terminal device within one beam training period is $M+R_1$. The terminal device receives, at the time-frequency resource positions within each beam training period, $M+R_1$ pieces of pilot information, i.e., receiving M pieces of operating beam pilot information and $R_1$ pieces of query beam pilot information. Upon receiving the pilot information, the terminal device detects the signal quality of the pilot information and then feeds the signal quality and beam numbers of the $M+R_1$ pieces of beam pilot information back to the network device.

In a third aspect, an embodiment of the present disclosure provides a beam training method, which is applied to a system including a network device and a terminal device. The beam training method includes the beam training method described in the first aspect and the beam training method described in the second aspect.

The beam training method described in the first aspect and the beam training method described in the second aspect will be described below by four application examples. In the four application examples, the network device is a base station.

Application Example One

In the application example one, in different beam training periods, the operating beams have the same beam width, and the query beams also have the same beam width.

The base station acquires 64 beams (i.e., N=64) covering a target region as a beam set Z, i.e., $\{Z_1, Z_2, \ldots, Z_{64}\}$. A beam set to be issued is selected from the beam set Z for beam training. The issued beam set includes an operating beam set and a query beam set, where the operating beam set is W, i.e., $\{W_1, W_2, \ldots, W_{16}\}$, and has a total of 16 operating beams (i.e., M=16); and, the query beam set is S, i.e., $\{S_1, S_2, \ldots, S_{48}\}$, and has a total of 48 query beams (i.e., $K_1$=48).

The 48 query beams are grouped into 6 groups, i.e., group 1, group 2, . . . , (i.e., $Q_1$=6), and each group has 8 query beams (i.e., $R_1$=8). Since the time-frequency resource positions of the operating beams are in one-to-one mapping with the operating beams (that is, one time-frequency resource position maps one operating beam and one operating beam number), there are a total of 16 issued time-frequency resource positions during the operating beam issuing time within each beam training period T; whereas since the time-frequency resource positions of the query beams are in one-to-multiple mapping with the query beams (that is, one time-frequency resource position maps multiple query beams and query beam numbers), there are a total of 8 issued time-frequency resource positions during the query beam issuing time within each beam training period T. That is, there are 16+8=24 time-frequency resource positions issued within each beam training period T, and 6 beam training periods are needed for the beam training of the operating beam set and the query beam set.

TABLE 1

Mapping table of issued beams and time-frequency resource positions

| Beam training period | Time-frequency resource position | Operating beam | Query beam |
|---|---|---|---|
| T1 | 1 | 1 | Null |
| T1 | 2 | 2 | Null |
| T1 | 3 | 3 | Null |
| T1 | . . . | . . . | Null |
| T1 | 16 | 16 | Null |
| T1 | 17 | Null | 1 |
| T1 | 18 | Null | 2 |
| T1 | . . . | Null | . . . |
| T1 | 24 | Null | 8 |
| T2 | 1 | 1 | Null |
| T2 | 2 | 2 | Null |
| T2 | 3 | 3 | Null |
| T2 | . . . | . . . | Null |
| T2 | 16 | 16 | Null |
| T2 | 17 | Null | 9 |
| T2 | 18 | Null | 10 |
| T2 | . . . | Null | . . . |
| T2 | 24 | Null | 16 |
| . . . | . . . | . . . | . . . |
| T6 | 1 | 1 | Null |
| T6 | 2 | 2 | Null |
| T6 | 3 | 3 | Null |
| T6 | . . . | . . . | Null |
| T6 | 16 | 16 | Null |
| T6 | 17 | Null | 41 |
| T6 | 18 | Null | 42 |
| T6 | . . . | Null | . . . |
| T6 | 24 | Null | 48 |

It can be known from Table 1 that:

during the operating beam issuing times within different beam training periods, the issued operating beams remain unchanged.

During the query beam issuing times within different beam training periods, the issued query beams are issued in groups. During the query beam issuing time within a first beam training period, a first group of query beams are issued; during the query beam issuing time within a second beam training period, a second group of query beams are issued; and by that analogy, during the query beam issuing time within a sixth beam training period, a sixth group of query beams are issued.

This beam issuing process is repeated until all query beam groups are transmitted for one time.

Meanwhile, in each beam training period issued by the base station, the terminal device receives 16 pieces of operating beam pilot information and 8 pieces of query beam pilot information at 24 occasions and corresponding time-frequency resource positions, detects the signal quality (including but not limited to RSRP and SINR) of the known pilot information, and feeds 24 beam numbers and signal qualities to the base station. That is, the beam numbers are in one-to-one correspondence to the signal quality of the corresponding beams, so that the base station can know the signal quality corresponding to each operating beam or query beam.

The base station selects, according to the signal quality of the operating beams and the query beams fed back by the terminal device, an optimal beam pair set between the base station and the terminal device to complete beam training.

During this process, the base station uses 24 time-frequency resource positions and trains 64 beams; however, in some cases, 64 time-frequency resource positions are needed for training 64 beams. Therefore, the beam training method in this embodiment significantly reduces the system overhead and improves the beam training efficiency.

Better yet, no storage overhead and reporting overhead are added for the terminal device during this process.

Application Example Two

In the application example two, in different total beam training periods, the operating beams have the same beam width, and the query beams have different beam widths. By taking two total beam training periods as an example, the first total beam training period includes three beam training periods T, and the second total beam training period includes six beam training periods T. One wide beam of the query beams in the first total beam training period and two narrow beams of the query beams in the second total beam training period correspond to the same coverage region. It should be understood that the number of query beams in the second total beam training period is 2 times the number of query beams in the first total beam training period.

The first total beam training period (the query beams are wide beams) is described below.

The base station acquires 40 beams (i.e., N=40) covering a target region as a beam set Z, i.e., $\{Z_1, Z_2, \ldots, Z_{40}\}$. A beam set to be issued is selected from the beam set Z for beam training. The issued beam set includes an operating beam set and a query beam set, where the operating beam set is W, i.e., $\{W_1, W_2, \ldots, W_{16}\}$, and has a total of 16 operating beams (i.e., M=16); and, the query beam set is S, i.e., $\{S_1, S_2, \ldots, S_{24}\}$, and has a total of 24 query beams (i.e., $K_1$=24).

The 24 query beams are grouped into 3 groups, i.e., group 1, group 2, ..., (i.e., $Q_1$=3), and each group has 8 query beams (i.e., $R_1$=8). Since the time-frequency resource positions of the operating beams are in one-to-one mapping with the operating beams (that is, one time-frequency resource position maps one operating beam and one operating beam number), there are a total of 16 issued time-frequency resource positions during the operating beam issuing time within each beam training period T; whereas since the time-frequency resource positions of the query beams are in one-to-multiple mapping with the query beams (that is, one time-frequency resource position maps multiple query beams and query beam numbers), there are a total of 8 issued time-frequency resource positions during the query beam issuing time within each beam training period T. That is, there are 16+8=24 time-frequency resource positions issued within each beam training period T, and 3 beam training periods are needed for the beam training of the operating beam set and the query beam set.

TABLE 2

Mapping table of issued beams and time-frequency resource positions (in the first total training period, the query beams are wide beams)

| Beam training period | Time-frequency resource position | Operating beam | Query beam |
|---|---|---|---|
| T1 | 1 | 1 | Null |
| T1 | 2 | 2 | Null |
| T1 | 3 | 3 | Null |

TABLE 2-continued

Mapping table of issued beams and time-frequency resource positions (in the first total training period, the query beams are wide beams)

| Beam training period | Time-frequency resource position | Operating beam | Query beam |
|---|---|---|---|
| T1 | ... | ... | Null |
| T1 | 16 | 16 | Null |
| T1 | 17 | Null | 1 |
| T1 | 18 | Null | 2 |
| T1 | ... | Null | ... |
| T1 | 24 | Null | 8 |
| T2 | 1 | 1 | Null |
| T2 | 2 | 2 | Null |
| T2 | 3 | 3 | Null |
| T2 | ... | ... | Null |
| T2 | 16 | 16 | Null |
| T2 | 17 | Null | 9 |
| T2 | 18 | Null | 10 |
| T2 | ... | Null | ... |
| T2 | 24 | Null | 16 |
| T3 | 1 | 1 | Null |
| T3 | 2 | 2 | Null |
| T3 | 3 | 3 | Null |
| T3 | ... | ... | Null |
| T3 | 16 | 16 | Null |
| T3 | 17 | Null | 17 |
| T3 | 18 | Null | 18 |
| T3 | ... | Null | ... |
| T3 | 24 | Null | 24 |

It can be known from Table 2 that:

during the operating beam issuing times within different beam training periods, the issued operating beams remain unchanged.

During the query beam issuing times within different beam training periods, the issued query beams are issued in groups. During the query beam issuing time within a first beam training period, a first group of query beams are issued; during the query beam issuing time within a second beam training period, a second group of query beams are issued; and by that analogy, at the query beam issuing time within a third beam training period, a third group of query beams are issued.

This beam issuing process is repeated until all query beam groups are transmitted for one time.

Meanwhile, in each beam training period issued by the base station, the terminal device receives 16 pieces of operating beam pilot information and 8 pieces of query beam pilot information at 24 occasions and corresponding time-frequency resource positions, detects the signal quality (including but not limited to RSRP and SINR) of the known pilot information, and feeds 24 beam numbers and signal qualities to the base station.

The base station selects, according to the signal quality of the operating beams and the query beams fed back by the terminal device, an optimal beam pair set between the base station and the terminal device to complete beam training.

In the first total beam training period, the base station uses 24 time-frequency resource positions and trains 40 beams, so that the system overhead is significantly reduced and the beam training efficiency is improved.

The second total beam training period (the query beams are narrow beams) is described below.

The base station acquires 64 beams (i.e., N=64) covering a target region as a beam set Z, i.e., $\{Z_1, Z_2, \ldots, Z_{64}\}$. A beam set to be issued is selected from the beam set Z for beam training. The issued beam set includes an operating beam set and a query beam set, where the operating beam set is W, i.e., $\{W_1, W_2, \ldots, W_{16}\}$, and has a total of 16 operating beams (i.e., M=16); and, the query beam set is S, i.e., {$S_1$, $S_2$, . . . , $S_{48}$}, and has a total of 48 query beams (i.e., $K_2$=48).

The 48 query beams are grouped into 6 groups, i.e., group 1, group 2, . . . , (i.e., $Q_2$=6), and each group has 8 query beams (i.e., $R_2$=8). Since the time-frequency resource positions of the operating beams are in one-to-one mapping with the operating beams (that is, one time-frequency resource position maps one operating beam and one operating beam number), there are a total of 16 issued time-frequency resource positions during the operating beam issuing time within each beam training period T; whereas since the time-frequency resource positions of the query beams are in one-to-multiple mapping with the query beams (that is, one time-frequency resource position maps multiple query beams and query beam numbers), there are a total of 8 issued time-frequency resource positions during the query beam issuing time within each beam training period T. That is, there are 16+8=24 time-frequency resource positions issued within each beam training period T, and 6 beam training periods are needed for the beam training of the operating beam set and the query beam set.

TABLE 3

Mapping table of issued beams and time-frequency resource positions (in the second training period, the query beams are narrow beams)

| Beam training period | Time-frequency resource position | Operating beam | Query beam |
|---|---|---|---|
| T1 | 1 | 1 | Null |
| T1 | 2 | 2 | Null |
| T1 | 3 | 3 | Null |
| T1 | . . . | . . . | Null |
| T1 | 16 | 16 | Null |
| T1 | 17 | Null | 1 |
| T1 | 18 | Null | 2 |
| T1 | . . . | Null | . . . |
| T1 | 24 | Null | 8 |
| T2 | 1 | 1 | Null |
| T2 | 2 | 2 | Null |
| T2 | 3 | 3 | Null |
| T2 | . . . | . . . | Null |
| T2 | 16 | 16 | Null |
| T2 | 17 | Null | 9 |
| T2 | 18 | Null | 10 |
| T2 | . . . | Null | . . . |
| T2 | 24 | Null | 16 |
| . . . | . . . | . . . | . . . |
| T6 | 1 | 1 | Null |
| T6 | 2 | 2 | Null |
| T6 | 3 | 3 | Null |
| T6 | . . . | . . . | Null |
| T6 | 16 | 16 | Null |
| T6 | 17 | Null | 41 |
| T6 | 18 | Null | 42 |
| T6 | . . . | Null | . . . |
| T6 | 24 | Null | 48 |

It can be known from Table 3 that:

during the operating beam issuing times within different beam training periods, the issued operating beams remain unchanged.

During the query beam issuing times within different beam training periods, the issued query beams are issued in groups. During the query beam issuing time within a first beam training period, a first group of query beams are issued; during the query beam issuing time within a second beam training period, a second group of query beams are issued; and by that analogy, during the query beam issuing time within a sixth beam training period, a sixth group of query beams are issued.

This beam issuing process is repeated until all query beam groups are transmitted for one time.

Meanwhile, in each beam training period issued by the base station, the terminal device receives 16 pieces of operating beam pilot information and 8 pieces of query beam pilot information at 24 occasions and corresponding time-frequency resource positions, detects the signal quality (including but not limited to RSRP and SINR) of the known pilot information, and feeds 24 beam numbers and signal qualities to the base station.

The base station selects, according to the signal quality of the operating beams and the query beams fed back by the terminal device, an optimal beam pair set between the base station and the terminal device to complete beam training.

In the second total beam training period, the base station uses 24 time-frequency resource positions and trains 64 beams, so that the system overhead is significantly reduced and the beam training efficiency is improved.

Application Example Three

The base station acquires 64 beams (i.e., N=64) covering a target region as a beam set Z, i.e., {$Z_1$, $Z_2$, . . . , $Z_{64}$}.

When there are multiple terminal devices on the terminal device side, a coverage angle range of the base station needs to be changed to satisfy the condition that the beams issued by the base station can cover multiple terminal devices. It is worth noting that each terminal device is configured with ID information.

A beam set to be issued is selected from the beam set Z for beam training. The issued beam set includes an operating beam set and a query beam set, where the operating beam set is W, i.e., {$W_1$, $W_2$, . . . , $W_{16}$}, and has a total of 16 operating beams (i.e., M=16); and, the query beam set is S, i.e., {$S_1$, $S_2$, . . . , $S_{48}$}, and has a total of 48 query beams (i.e., $K_1$=48).

The 48 query beams are grouped into 6 groups, i.e., group 1, group 2, . . . , (i.e., $Q_1$=6), and each group has 8 query beams (i.e., $R_1$=8). Since the time-frequency resource positions of the operating beams are in one-to-one mapping with the operating beams (that is, one time-frequency resource position maps one operating beam and one operating beam number), there are a total of 16 issued time-frequency resource positions during the operating beam issuing time within each beam training period T; whereas since the time-frequency resource positions of the query beams are in one-to-multiple mapping with the query beams (that is, one time-frequency resource position maps multiple query beams and query beam numbers), there are a total of 8 issued time-frequency resource positions during the query beam issuing time within each beam training period T. That is, there are 16+8=24 time-frequency resource positions issued within each beam training period T, and 6 beam training periods are needed for the beam training of the operating beam set and the query beam set.

TABLE 4

Mapping table of issued beams and time-frequency resource positions

| Beam training period | Time-frequency resource position | Operating beam | Query beam |
|---|---|---|---|
| T1 | 1 | 1 | Null |
| T1 | 2 | 2 | Null |
| T1 | 3 | 3 | Null |
| T1 | . . . | . . . | Null |

TABLE 4-continued

Mapping table of issued beams and
time-frequency resource positions

| Beam training period | Time-frequency resource position | Operating beam | Query beam |
| --- | --- | --- | --- |
| T1 | 16 | 16 | Null |
| T1 | 17 | Null | 1 |
| T1 | 18 | Null | 2 |
| T1 | ... | Null | ... |
| T1 | 24 | Null | 8 |
| T2 | 1 | 1 | Null |
| T2 | 2 | 2 | Null |
| T2 | 3 | 3 | Null |
| T2 | ... | ... | Null |
| T2 | 16 | 16 | Null |
| T2 | 17 | Null | 9 |
| T2 | 18 | Null | 10 |
| T2 | ... | Null | ... |
| T2 | 24 | Null | 16 |
| ... | ... | ... | ... |
| T6 | 1 | 1 | Null |
| T6 | 2 | 2 | Null |
| T6 | 3 | 3 | Null |
| T6 | ... | ... | Null |
| T6 | 16 | 16 | Null |
| T6 | 17 | Null | 41 |
| T6 | 18 | Null | 42 |
| T6 | ... | Null | ... |
| T6 | 24 | Null | 48 |

It can be known from Table 4 that:

during the operating beam issuing times within different beam training periods, the issued operating beams remain unchanged.

During the query beam issuing times within different beam training periods, the issued query beams are issued in groups. At the query beam issuing time within a first beam training period, a first group of query beams are issued; during the query beam issuing time within a second beam training period, a second group of query beams are issued; and by that analogy, during the query beam issuing time within a sixth beam training period, a sixth group of query beams are issued.

This beam issuing process is repeated until all query beam groups are transmitted for one time.

Meanwhile, in each beam training period issued by the base station, the terminal device receives 16 pieces of operating beam pilot information and 8 pieces of query beam pilot information at 24 occasions and corresponding time-frequency resource positions, detects the signal quality (including but not limited to RSRP and SINR) of the known pilot information, and feeds 24 beam numbers and signal qualities as well as the ID information of the terminal devices to the base station.

The base station receives the signal quality fed back by multiple terminal devices, and selects, according to the signal quality of the operating beams and the query beams fed back by the multiple terminal devices and the ID information of the terminal devices, an optimal beam pair set between the base station and the corresponding terminal device to complete beam training.

The base station compares the signal quality of the operating beam with the signal quality of the query beam in the optimal beam pair set, and updates the operating beam set and the query beam set according to the result of comparison.

After the base station updates the operating beam set and the query beam set, the base station further updates the time-frequency resource positions according to the updated operating beam set and the updated query beam set. In an embodiment, the number of time-frequency resource positions is updated according to the number of operating beams in the updated operating beam set and the number of query beams in the updated query beam set.

Application Example Four

In the application example four, in different total beam training periods, the operating beams have different beam widths, and the query beams also have different beam widths. By taking two total beam training periods as an example, the first total beam training period includes three beam training periods T, and the second total beam training period includes five beam training periods T. In addition, during the process of issuing query beams, the number of time-frequency resource positions may be changed in each total beam training period. The number of time-frequency resource positions in the first total beam training period is 24, and the number of time-frequency resource positions in the second total beam training period is 32.

The first total beam training period (the number of time-frequency resource positions is 24) is described below.

The base station acquires 40 beams (i.e., N=40) covering a target region as a beam set Z, i.e., $\{Z_1, Z_2, \ldots, Z_{40}\}$. A beam set to be issued is selected from the beam set Z for beam training. The issued beam set includes an operating beam set and a query beam set, where the operating beam set is W, i.e., $\{W_1, W_2, \ldots, W_{16}\}$, and has a total of 16 operating beams (i.e., M=16); and, the query beam set is S, i.e., $\{S_1, S_2, \ldots, S_{24}\}$, and has a total of 24 query beams (i.e., $K_1=24$).

The 24 query beams are grouped into 3 groups, i.e., group 1, group 2, ..., (i.e., $Q_1=3$), and each group has 8 query beams (i.e., $R_1=8$). Since the time-frequency resource positions of the operating beams are in one-to-one mapping with the operating beams (that is, one time-frequency resource position maps one operating beam and one operating beam number), there are a total of 16 issued time-frequency resource positions during the operating beam issuing time within each beam training period T; whereas since the time-frequency resource positions of the query beams are in one-to-multiple mapping with the query beams (that is, one time-frequency resource position maps multiple query beams and query beam numbers), there are a total of 8 issued time-frequency resource positions at the query beam issuing time within each beam training period T. That is, there are 16+8=24 time-frequency resource positions issued within each beam training period T, and 3 beam training periods are needed for the beam training of the operating beam set and the query beam set.

TABLE 5

Mapping table of issued beams and time-frequency resource
positions (in the first total training period, the
number of time-frequency resource positions is 24)

| Beam training period | Time-frequency resource position | Operating beam | Query beam |
| --- | --- | --- | --- |
| T1 | 1 | 1 | Null |
| T1 | 2 | 2 | Null |
| T1 | 3 | 3 | Null |
| T1 | ... | ... | Null |
| T1 | 16 | 16 | Null |
| T1 | 17 | Null | 1 |
| T1 | 18 | Null | 2 |
| T1 | ... | Null | ... |

TABLE 5-continued

Mapping table of issued beams and time-frequency resource positions (in the first total training period, the number of time-frequency resource positions is 24)

| Beam training period | Time-frequency resource position | Operating beam | Query beam |
|---|---|---|---|
| T1 | 24 | Null | 8 |
| T2 | 1 | 1 | Null |
| T2 | 2 | 2 | Null |
| T2 | 3 | 3 | Null |
| T2 | ... | ... | Null |
| T2 | 16 | 16 | Null |
| T2 | 17 | Null | 9 |
| T2 | 18 | Null | 10 |
| T2 | ... | Null | ... |
| T2 | 24 | Null | 16 |
| T3 | 1 | 1 | Null |
| T3 | 2 | 2 | Null |
| T3 | 3 | 3 | Null |
| T3 | ... | ... | Null |
| T3 | 16 | 16 | Null |
| T3 | 17 | Null | 17 |
| T3 | 18 | Null | 18 |
| T3 | ... | Null | ... |
| T3 | 24 | Null | 24 |

It can be known from Table 5 that:

during the operating beam issuing times within different beam training periods, the issued operating beams remain unchanged.

During the query beam issuing times within different beam training periods, the issued query beams are issued in groups. During the query beam issuing time within a first beam training period, a first group of query beams are issued; during the query beam issuing time within a second beam training period, a second group of query beams are issued; and by that analogy, during the query beam issuing time within a third beam training period, a third group of query beams are issued.

This beam issuing process is repeated until all query beam groups are transmitted for one time.

Meanwhile, in each beam training period issued by the base station, the terminal device receives 16 pieces of operating beam pilot information and 8 pieces of query beam pilot information at 24 occasions and corresponding time-frequency resource positions, detects the signal quality (including but not limited to RSRP and SINR) of the known pilot information, and feeds 24 beam numbers and signal qualities to the base station.

The base station selects, according to the signal quality of the operating beams and the query beams fed back by the terminal device, an optimal beam pair set between the base station and the terminal device for beam training.

In the first beam training period, the base station uses 24 time-frequency resource positions and trains 40 beams, so that the system overhead is significantly reduced and the beam training efficiency is improved.

The second total beam training period (the number of time-frequency resource positions is 32) is described below.

The base station acquires 64 beams (i.e., N=64) covering a target region as a beam set Z, i.e., $\{Z_1, Z_2, \ldots, Z_{64}\}$. A beam set to be issued is selected from the beam set Z for beam training. The issued beam set includes an operating beam set and a query beam set, where the operating beam set is W, i.e., $\{W_1, W_2, \ldots, W_{24}\}$, and has a total of 24 operating beams (i.e., M=24); and, the query beam set is S, i.e., $\{S_1, S_2, \ldots, S_{40}\}$, and has a total of 40 query beams (i.e., $K_2$=40).

The 40 query beams are grouped into 5 groups, i.e., group 1, group 2, . . . , (i.e., $Q_2$=5), and each group has 8 query beams (i.e., $Q_2$=8). Since the time-frequency resource positions of the operating beams are in one-to-one mapping with the operating beams (that is, one time-frequency resource position maps one operating beam and one operating beam number), there are a total of 24 issued time-frequency resource positions during the operating beam issuing time within each beam training period T; whereas since the time-frequency resource positions of the query beams are in one-to-multiple mapping with the query beams (that is, one time-frequency resource position maps multiple query beams and query beam numbers), there are a total of 8 issued time-frequency resource positions at the query beam issuing time within each beam training period T. That is, there are 24+8=32 time-frequency resource positions issued within each beam training period T, and 5 beam training periods are needed for the beam training of the operating beam set and the query beam set.

TABLE 6

Mapping table of issued beams and time-frequency resource positions (in the second total training period, the number of time-frequency resource positions is 32)

| Beam training period | Time-frequency resource position | Operating beam | Query beam |
|---|---|---|---|
| T1 | 1 | 1 | Null |
| T1 | 2 | 2 | Null |
| T1 | 3 | 3 | Null |
| T1 | ... | ... | Null |
| T1 | 24 | 24 | Null |
| T1 | 25 | Null | 1 |
| T1 | 26 | Null | 2 |
| T1 | ... | Null | ... |
| T1 | 32 | Null | 8 |
| T2 | 1 | 1 | Null |
| T2 | 2 | 2 | Null |
| T2 | 3 | 3 | Null |
| T2 | ... | ... | Null |
| T2 | 24 | 24 | Null |
| T2 | 25 | Null | 9 |
| T2 | 26 | Null | 10 |
| T2 | ... | Null | ... |
| T2 | 32 | Null | 16 |
| ... | ... | ... | ... |
| T5 | 1 | 1 | Null |
| T5 | 2 | 2 | Null |
| T5 | 3 | 3 | Null |
| T5 | ... | ... | Null |
| T5 | 24 | 24 | Null |
| T5 | 25 | Null | 33 |
| T5 | 26 | Null | 34 |
| T5 | ... | Null | ... |
| T5 | 24 | Null | 40 |

It can be known from Table 6 that:

during the operating beam issuing times within different beam training periods, the issued operating beams remain unchanged.

During the query beam issuing times within different beam training periods, the issued query beams are issued in groups. At the query beam issuing time within a first beam training period, a first group of query beams are issued; during the query beam issuing time within a second beam training period, a second group of query beams are issued; and by that analogy, at the query beam issuing time within a fifth beam training period, a fifth group of query beams are issued.

This beam issuing process is repeated until all query beam groups are transmitted for one time.

Meanwhile, in each beam training period issued by the base station, the terminal device receives 24 pieces of operating beam pilot information and 8 pieces of query beam pilot information at 32 occasions and corresponding time-frequency resource positions, detects the signal quality (including but not limited to RSRP and SINR) of the known pilot information, and feeds 32 beam numbers and signal qualities to the base station.

The base station selects, according to the signal quality of the operating beams and the query beams fed back by the terminal device, an optimal beam pair set between the base station and the terminal device to complete beam training.

In the second total beam training period, the base station uses 32 time-frequency resource positions and trains 64 beams, so that the system overhead is significantly reduced and the beam training efficiency is improved.

In the application example four, in different total beam training periods, both the operating beam set and the query beam set are changed. During this process, due to the increase in the number of operating beams, the opportunity of receiving operating beams by the terminal device is increased, and query is continuously performed by utilizing query beams, thereby expanding the coverage region of the base station.

In a fourth aspect, an embodiment of the present disclosure provides a network device. The network device includes a memory, a processor and a program stored in the memory and executable by the processor which, when executed by the processor, causes the processor to implement the beam training method described in the first aspect.

In some embodiments, the network device is a base station, or may be other network devices which can realize the function of the base station.

In a fifth aspect, an embodiment of the present disclosure provides a terminal device. The terminal device includes a memory, a processor and a program stored in the memory and executable by the processor which, when executed by the processor, causes the processor to implement the beam training method described in the second aspect.

In some embodiments, the terminal device may be a mobile terminal device or a non-mobile terminal device. The mobile terminal device may be a mobile phone, a tablet computer, a notebook computer, a palmtop computer, a vehicle-mounted terminal device, a wearable device, a super mobile personal computer, a netbook, a personal digital assistant, etc. The non-mobile terminal device may be a personal computer, a TV set, a teller machine, a self-service machine, etc. This will not be specifically limited in the embodiments of the present disclosure.

In a sixth aspect, an embodiment of the present disclosure provides a beam training system. The system includes a network device and a terminal device. The network device is configured to execute the steps in the beam training method described in the first aspect, and the terminal device is configured to execute the steps in the beam training method described in the second aspect, thus performing the beam training between the network device and the terminal device.

In some embodiments, the network device is a base station, or may be other network devices which can realize the function of the base station.

In some embodiments, the terminal device may be a mobile terminal device or a non-mobile terminal device. The mobile terminal device may be a mobile phone, a tablet computer, a notebook computer, a palmtop computer, a vehicle-mounted terminal device, a wearable device, a super mobile personal computer, a netbook, a personal digital assistant, etc. The non-mobile terminal device may be a personal computer, a TV set, a teller machine, a self-service machine, etc. This will not be specifically limited in the embodiments of the present disclosure.

In a seventh aspect, an embodiment of the present disclosure provides a storage medium for computer-readable storage. The storage medium stores one or more programs executable by one or more processors which, when executed by the one or more processors, cause the one or more processor to implement the beam training method described in the first aspect or the beam training method described in the second aspect.

The embodiments of the present disclosure are mainly to provide a beam training method, a network device, a terminal device, a system and a storage medium, which are intended to train more beams by utilizing fewer time-frequency resource positions, so as to improve the beam training efficiency and reduce the system overhead.

In the beam training method, the network device, the terminal device, the system and the storage medium provided by the present disclosure, the operating beams and the query beams are issued by the base station. In different beam training periods, the query beams are issued in groups, so that the number of time-frequency resource positions issued within each training period (the number of operating beams+ the number of query beams in each group) is decreased. Accordingly, more beams are trained by utilizing fewer time-frequency resource positions, so that the beam training efficiency is improved and the system overhead is reduced.

It should be understood by those having ordinary skills in the art that, all or some of the steps in the methods disclosed above and the functional modules/units in the systems and devices disclosed above may be implemented as software, firmware, hardware and suitable combinations thereof.

In the hardware implementation, the division of the functional modules/units mentioned above does not necessarily correspond to the division of physical components. For example, one physical component may have multiple functions, or one function or step may be cooperatively executed by multiple physical components. Some or all of the physical components may be implemented as software executed by processors such as central processors, digital signal processors or microprocessors, or implemented as hardware, or implemented as integrated circuits such as application-specific integrated circuits. Such software may be distributed on computer-readable mediums, and the computer-readable mediums may include computer storage mediums (or non-transitory mediums) and communication mediums (or transitory mediums). As well-known to those having ordinary skills in the art, the term computer storage medium includes volatile or non-volatile and removable or non-removable mediums implemented in any method or technology used to store information (such as computer-readable instructions, data structures, program modules or other data). The computer storage mediums may include, but not limited to, RAMs, ROMs, EEPROMs, flash memories and other memory technologies, CD-ROMs, digital versatile disks (DVDs) or other optical disk storages, magnetic cassettes, magnetic tapes, magnetic disk storages or other magnetic storage devices, or any other mediums that can be used to store desired information and can be accessed by computers. In addition, as well-known to those having ordinary skills in the art, the communication mediums generally contain computer-readable instructions, data structures, program modules or other data in modulation data signals such as carriers or other transmission mechanisms, and may include any information transfer medium.

Although some embodiments of the present disclosure have been described above with reference to the accompanying drawings, the protection scope of the present disclosure is not limited thereto. Any modifications, equivalent replacements and improvements made within the scope and essence of the present disclosure by those having ordinary skills in the art shall fall into the protection scope of the present disclosure.

What is claimed is:

1. A beam training method, comprising:
acquiring an operating beam set and a query beam set, wherein the operating beam set comprises at least one operating beam, the query beam set comprises $K_1$ query beams, the $K_1$ query beams are divided into $Q_1$ query beam groups, and both $K_1$ and $Q_1$ are positive integers greater than or equal to 2;
issuing multiple pieces of pilot information by utilizing time-frequency resource positions within $Q_1$ beam training periods to train the operating beam set and the query beam set, and
receiving signal quality of the operating beam and the query beam fed back by a terminal device, wherein:
each of the beam training periods comprises an operating beam issuing time and a query beam issuing time; and
issuing the multiple pieces of pilot information by utilizing time-frequency resource positions within $Q_1$ beam training periods comprises:
for each beam training period, transmitting, at a time-frequency resource position within the operating beam issuing time corresponding to the beam training period, the multiple pieces of pilot information by utilizing an operating beam in the operating beam set; and
transmitting, at a time-frequency resource position within the query beam issuing time corresponding to the beam training period, the multiple pieces of pilot information by utilizing a query beam in any of the query beam groups.

2. The beam training method of claim 1, wherein transmitting, at a time-frequency resource position within the query beam issuing time corresponding to the respective beam training period, the multiple pieces of pilot information by utilizing a query beam in any of the query beam groups comprises:
transmitting, at a time-frequency resource position within the query beam issuing time corresponding to the respective beam training period, the multiple pieces of pilot information by utilizing a query beam in any of the query beam groups, so that $Q_1$ query beam groups are trained respectively within $Q_1$ beam training periods.

3. The beam training method of claim 1, further comprising:
notifying the terminal device of a number of pieces of pilot information issued within each beam training period, so that the terminal device can receive the operating beam and the query beam according to the number of pieces of pilot information.

4. The beam training method of claim 3, further comprising:
determining an optimal beam pair set according to the signal quality of the operating beam and the query beam.

5. The beam training method of claim 4, further comprising:
after determining the optimal beam pair set,
comparing the signal quality of the operating beam with the signal quality of the query beam in the optimal beam pair set; and
updating the operating beam set and the query beam set according to a result of comparison.

6. The beam training method of claim 5, wherein updating the operating beam set and the query beam set according to a result of comparison comprises:
determining whether a difference between the signal quality of the operating beam and the signal quality of the query beam in the optimal beam pair set is greater than a first threshold value; and
in response to the difference between the signal quality of the operating beam and the signal quality of the query beam in the optimal beam pair set being greater than the first threshold value, deleting the query beam from the query beam set, and adding the query beam into the operating beam set as an operating beam.

7. The beam training method of claim 6, wherein updating the operating beam set and the query beam set according to a result of comparison further comprises:
determining whether the difference between the signal quality of the operating beam and the signal quality of the query beam in the optimal beam pair set is less than a second threshold value; and
in response to the difference between the signal quality of the operating beam and the signal quality of the query beam in the optimal beam pair set being less than the second threshold value, deleting the operating beam from the operating beam set, and adding the operating beam into the query beam set as a query beam.

8. The beam training method of claim 4, further comprising:
updating, according to a proportion of optimal beams in the optimal beam pair set being a query beam fed back by the terminal device, the operating beam set and the query beam set; or,
updating the operating beam set and the query beam set according to attribute parameters of the terminal device.

9. The beam training method of claim 1, further comprising:
updating a beam width of the operating beam or a beam width of the query beam or a grouping mode of the query beam set, and executing following operations:
acquiring the updated operating beam set and the updated query beam set, wherein the updated operating beam set comprises at least one operating beam, the updated query beam set comprises $K_2$ query beams, the $K_2$ query beams are divided into $Q_2$ query beam groups, and both $K_2$ and $Q_2$ are positive integers greater than or equal to 2; and
issuing the multiple pieces of pilot information by utilizing time-frequency resource positions within $Q_2$ beam training periods to train the updated operating beam set and the updated query beam set, wherein:
each of the beam training periods comprises an operating beam issuing time and a query beam issuing time; and
issuing the multiple pieces of pilot information by utilizing time-frequency resource positions within $Q_2$ beam training periods comprises:

for each beam training period, transmitting, at a time-frequency resource position within the operating beam issuing time corresponding to the beam training period, the multiple pieces of pilot information by utilizing an operating beam in the updated operating beam set; and transmitting, at a time-frequency resource position within the query beam issuing time corresponding to the beam training period, the multiple pieces of pilot information by utilizing a query beam in any of the updated query beam groups.

10. A beam training method, comprising:

receiving, at time-frequency resource positions within $Q_1$ beam training periods, multiple pieces of pilot information from a network device, wherein the multiple pieces of pilot information comprises at least one piece of operating beam pilot information and $K_1$ pieces of query beam pilot information, the operating beam pilot information is pilot information transmitted using an operating beam by the network device within $Q_1$ operating beam issuing times of $Q_1$ beam training periods, the query beam pilot information is pilot information transmitted using any query beam group by the network device within $Q_1$ query beam issuing times of $Q_1$ beam training periods, and both $K_1$ and $Q_1$ are positive integers greater than or equal to 2;

detecting signal quality of the multiple pieces of pilot information; and feeding the signal quality of beams corresponding to the multiple pieces of pilot information back to the network device.

11. The beam training method of claim 10, further comprising:

receiving a number of pieces of pilot information issued within each beam training period from the network device;

wherein receiving, at time-frequency resource positions within $Q_1$ beam training periods, multiple pieces of pilot information from a network device comprises:

receiving, at time-frequency resource positions within each beam training period, pilot information corresponding to the number of pieces of pilot information.

12. A network device, comprising:

a memory;

a processor; and a program stored in the memory and executable by the processor which, when executed by the processor, causes the processor to perform the beam training method of claim 1.

13. A terminal device, comprising:

a memory;

a processor; and a program stored in the memory and executable by the processor which, when executed by the processor, causes the processor to perform the beam training method of claim 10.

14. A beam training system, comprising:

a network device, configured to perform a first beam training method comprising:

acquiring an operating beam set and a query beam set, wherein the operating beam set comprises at least one operating beam, the query beam set comprises $K_1$ query beams, the $K_1$ query beams are divided into $Q_1$ query beam groups, and both $K_1$ and $Q_1$ are positive integers greater than or equal to 2;

issuing multiple pieces of pilot information by utilizing time-frequency resource positions within $Q_1$ beam training periods to train the operating beam set and the query beam set, and receiving signal quality of the operating beam and the query beam fed back by a terminal device, wherein:

each of the beam training periods comprises an operating beam issuing time and a query beam issuing time; and issuing the multiple pieces of pilot information by utilizing time-frequency resource positions within $Q_1$ beam training periods comprises:

for each beam training period, transmitting, at a time-frequency resource position within the operating beam issuing time corresponding to the beam training period, the multiple pieces of pilot information by utilizing an operating beam in the operating beam set; and transmitting, at a time-frequency resource position within the query beam issuing time corresponding to the beam training period, the multiple pieces of pilot information by utilizing a query beam in any of the query beam groups; and the terminal device, configured to perform a second beam training method comprising:

receiving, at time-frequency resource positions within $Q_1$ beam training periods, multiple pieces of pilot information from the network device, wherein the multiple pieces of pilot information comprises at least one piece of operating beam pilot information and $K_1$ pieces of query beam pilot information, the operating beam pilot information is pilot information transmitted using an operating beam by the network device within $Q_1$ operating beam issuing times of $Q_1$ beam training periods, the query beam pilot information is pilot information transmitted using any query beam group by the network device within $Q_1$ query beam issuing times of $Q_1$ beam training periods;

detecting signal quality of the multiple pieces of pilot information; and feeding the signal quality of beams corresponding to the multiple pieces of pilot information back to the network device.

15. A non-transitory computer-readable storage medium, storing at least one program executable by at least one processor which, when executed by the at least one processor, causes the at least one processor to perform the beam training method of claim 1.

16. A non-transitory computer-readable storage medium, storing at least one program executable by at least one processor which, when executed by the at least one processor, causes the at least one processor to perform the beam training method of claim 10.

* * * * *